United States Patent [19]
Thompson

[11] 3,797,018
[45] Mar. 12, 1974

[54] MEANS FOR ENHANCING THE TARGET DETECTION CAPABILITY OF A RADAR RECEIVER

[75] Inventor: Lowell V. Thompson, Ventura, Calif.

[73] Assignee: The United States of America as represented by the Secretary of the Navy, Washington, D.C.

[22] Filed: Sept. 22, 1967

[21] Appl. No.: 670,522

[52] U.S. Cl............ 343/17.1 R, 325/479, 330/164, 330/167
[51] Int. Cl.............................................. G01s 7/28
[58] Field of Search.................... 325/323, 477, 479; 330/164, 165, 166, 167; 343/17.1 R

[56] References Cited
UNITED STATES PATENTS
2,997,674  8/1961  Jacobsen......................... 330/164 X Primary Examiner—T. H. Tubbesing
Attorney, Agent, or Firm—R. S. Sciascia; J. M. St. Amand

[57] ABSTRACT

A non-linear coupling circuit for incorporation into the I-F amplifier section of a radar receiver in order to improve the sub-clutter visibility thereof, such circuit acting in a discriminatory fashion to pass therethrough desired target signals while materially attenuating extended clutter and "jamming" energy. The circuit includes a pair of crystal diodes to which is applied a bias voltage derived from this clutter or jamming energy, such bias acting to preclude passage through the diodes of a major portion of the undesired signal while the target indications undergo negligible attenuation. The visibility of the latter is thus greatly enhanced on the radar scope.

6 Claims, 4 Drawing Figures

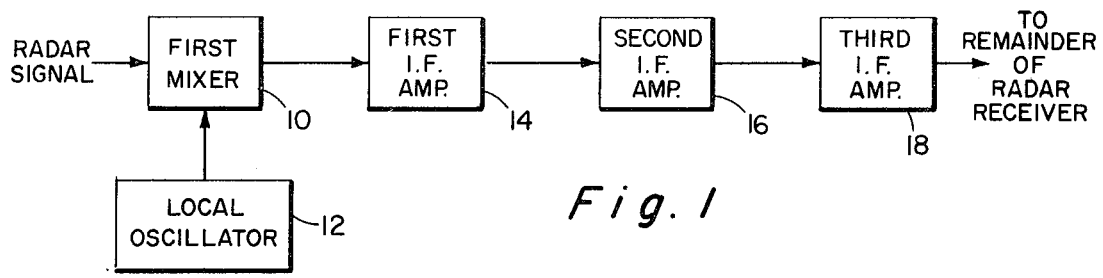
Fig. 1
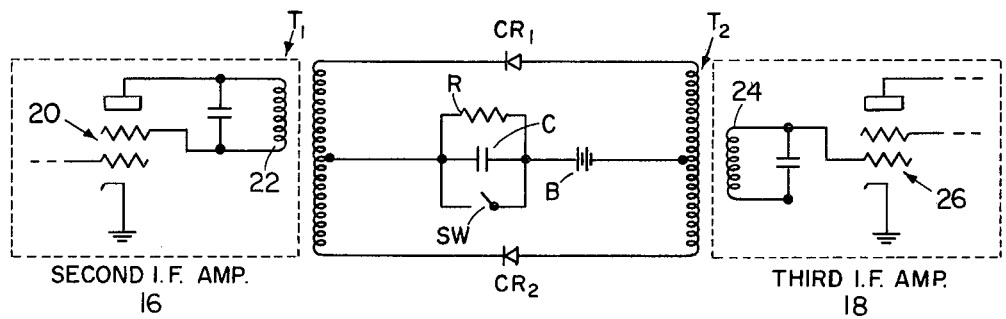
Fig. 2
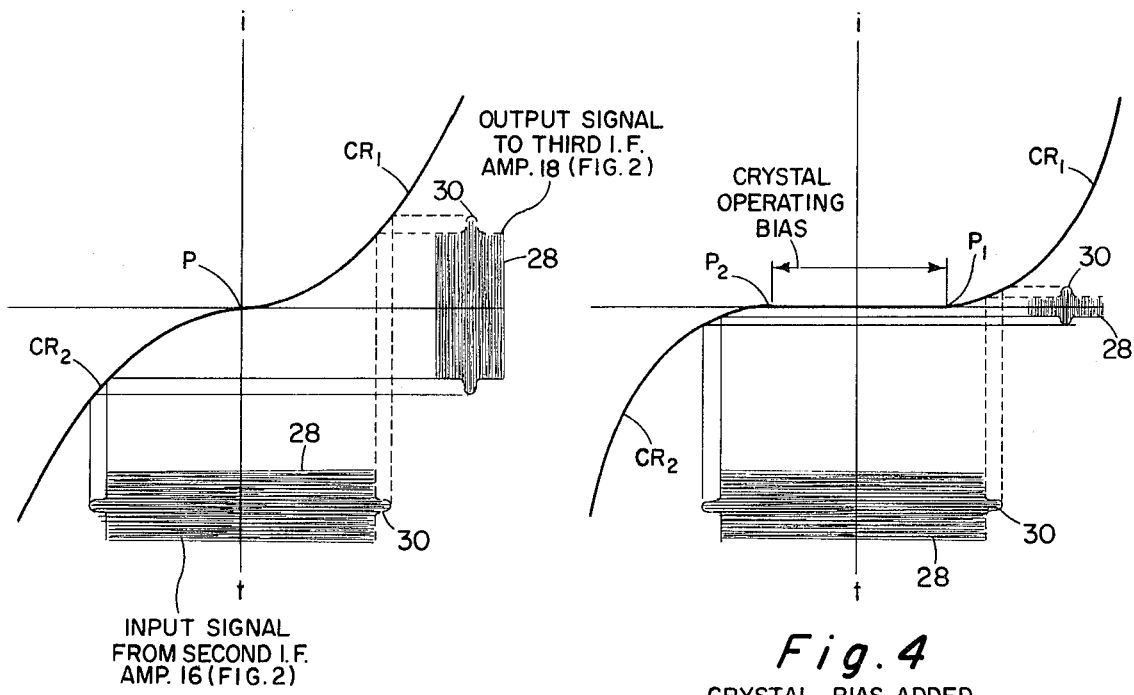
Fig. 3
WITH NO CRYSTAL BIAS
Fig. 4
CRYSTAL BIAS ADDED
INVENTOR.
LOWELL V. THOMPSON 3,797,018

MEANS FOR ENHANCING THE TARGET DETECTION CAPABILITY OF A RADAR RECEIVER

The invention described herein may be manufactured and used by or for the Government of the United States of America for governmental purposes without the payment of any royalties thereon or therefor.

The present invention relates to radar systems, and more particularly to apparatus for facilitating the identification of desired targets in the presence of clutter or during periods of intentional "jamming" by an enemy.

BACKGROUND OF THE NINVENTION

When environmental conditions are such that spurious signals possessing a high recurrence frequency are received by a search radar, desired targets are often incapable of being distinguished by the radar operator due to their submergence in a clutter or "white" background. The situation is even more serious when the radar is being jammed by a C-W signal emanating from an enemy transmitter on a wavelength within the generally broad band to which the radar's R-F circuits are tuned. In such cases the jamming signal can saturate the receiver circuitry and completely block the passage therethrough of all target information. Limiting networks are of little benefit, since they usually have a proportionally greater attenuating effect on the target signal than on the spurious energy per se.

In an attempt to overcome this disadvantage, radars have been designed so that the dynamic range of the clutter power is compressed. Unfortunately this amplitude compression also reduces the receiver gain for target signals whenever clutter energy is present. In a similar vein, automatic-gain-control arrangements which develop sufficient gain reduction to handle large clutter or jamming energies reduce desired target signals below the radar's detection capability. The problem thus becomes one of providing means in the receiver for decreasing the amplitude of the clutter or jamming energy to a substantial degree without significantly changing the amplitude of the target signals, thereby improving the ratio therebetween and facilitating the detection by an observer of indications representing such targets on the radar screen.

The present invention is directed to the provision of an arrangement for search radars which overcomes the above mentioned disadvantages and yields the objectives desired without employing an excessive number of additional components which, if present, would tend to materially increase the size and weight of the radar unit. Moreover, the overall reliability of the equipment is not diminished to any appreciable degree when the disclosed apparatus is incorporated therein.

SUMMARY OF THE INVENTION

An electrical circuit for employment in radar receivers, preferably between the second and third I-F amplifier stages. The circuit comprises a pair of transformers interconnected by a pair of crystal diodes in parallel relationship with an R-C network. When extended clutter or jamming is present, the R-C network develops a d-c bias for the diodes such that a major portion of the undesired energy is not passed thereby. However, returns representing desired targets fall on the linear portion of each diode's characteristic curve and hence are passed with negligible attenuation. The amplitude of such target returns is thus greatly increased relative to the attenuated clutter or jamming energy, and hence the former are rendered much more readily discenible by an observer viewing the radar scope.

One object of the present invention, therefore, is to increase the target detection capabilities of search radars.

Another object of the invention is to provide a non-linear coupling circuit for seach radars which attenuates extended clutter, jamming or other undesired energy to a greater extent than signals representing desired targets.

A further object of the invention is to provide a non-linear coupling circuit for radar receivers in which a pair of diodes are selectively biased by a voltage derived from the received clutter or jamming energy in such fashion as to shift the operating points of the diodes and thereby enable them to reject a major portion of such clutter or jamming energy while passing substantially all of the energy representing desired targets.

Other objects, advantages, and novel features of the invention will become apparent from the following detailed description of the invention when considered in conjunction with the accompanying drawings.

BRIEF DESCRIPTION OF THE DRAWINGS

FIG. 1 is a circuit diagram in block form of a portion of a conventional radar receiver;

FIG. 2 is a schematic circuit diagram of a preferred form of the present invention, shown as being inserted between the second and third amplifier stages of FIG. 1;

FIG. 3 is a graph showing an input signal applied to the composite characteristic curve of the diodes of FIG. 2 when no operating bias is applied thereto; and FIG. 4 is a graph along the lines of FIG. 3 but showing the effect of adding a bias to the diodes and thereby shifting the respective operating points thereof.

DESCRIPTION OF THE PREFERRED EMBODIMENT

Referring now to FIG. 1 of the drawings, there is shown a portion of the "front end" of a conventional radar receiver. In standard fashion, it includes a first mixer 10 to which an incoming radar signal is applied and combined with the output of a local oscillator 12. The output of the mixer 10 successively passes through a plurality of I-F amplifier stages 14, 16 and 18 and thence to the remainder of the radar receiver. The arrangement of FIG. 1 is entirely conventional, and is found in practically all radar services in use at the present time, such, for example, as that known as the AN-/APQ-92 search radar.

Referring now to FIG. 2 of the drawing, it may be assumed that the second I-F amplifier stage 16 of FIG. 1 includes the usual tube or electron discharge device 20 the output of which is applied to the primary winding 22 of a standard coupling transformer employed to transfer the amplfied signal energy to the third I-F amplifier stage 18. The latter includes the secondary winding 24 of this transformer, from which energy is conducted in the usual fashion to a further tube or electron disharge device 26. This mode of operation is standard practice in all respects.

The non-linear coupling circuit of the present invention is intended to be incorporated into the radar receiver preferably between the second I-F amplifier stage 16 and the third I-F amplifier stage 18, as shown in FIG. 2 of the drawings. The function of the circuit of the present concept is to non-linearly decouple the I-F amplifier tubes 20 and 26 whenever large clutter or jamming power is present in the signal received by the mixer 10 of FIG. 1.

In order to facilitate an understanding of the design and operation of applicant's novel circuit, it might be helpful to assume that the usual coupling transformer (that is, the windings 22 and 24) which couples the second I-F amplifier 16 to the third I-F amplifier 18 is replaced by two transformers $T_1$ and $T_2$, as shown in FIG. 2 of the drawings. The transformers $T_1$ and $T_2$ are magnetically isolated from one another and are tuned to the radar I-F frequency. The secondary winding of $T_1$ and the primary windig of $T_2$ have their respective ends interconnected by a pair of unidirectional current-conducting devices, such as the crystal diodes $CR_1$ and $CR_2$. Both transformers $T_1$ and $T_2$ are center-tapped, these respective center taps being joined by the series combination of a parallel R-C network and a battery or other source of constant bias potential, designated in the drawing by the reference character B.

The turns ratio of transformer $T_1$ is selected in a known manner to match the noise and signal voltage levels to the characteristics of the crystal diodes $CR_1$ and $CR_2$. The turns ratio of transformer $T_2$ is selected to match the output of transformer $T_1$ to the input of the third I-F amplifier stage 18. The value of capacitor C is determined by the impedance of the center-tapped windings of transformers $T_1$ and $T_2$ as well as by the forward resistance of the diodes $CR_1$ and $CR_2$. The value of resistor R is determined by the pulse width of the radar system.

The circuit of FIG. 2 of the drawings accomplishes non-linear decoupling between the amplifiers 16 and 18 through the development of a bias on capacitor C which is applied to the crystals $CR_1$ and $CR_2$, the value of this capacitor C being selected so that the bias voltage developed thereon follows the envelope of the clutter or jamming energy contained in the incoming radar signal. However, the time constant RC is so chosen that the capacitor voltage is not able to follow sharp or narrow pulses such as represent target return or other desired information. In other words, the product of R and C (the time constant of the network) is chosen so as to allow the rectified voltage which appears across the capacitor C and which biases the crystal $CR_1$ and $CR_2$ to follow the slowly-varying extended clutter or jamming energy but not to be appreciably affected by single target pulses. Expressed differently, the action of the R-C network is such as to allow the circuit to pass small variations in signal levels, while at the same time rejecting or reducing the clutter or jamming signals. In order to preclude the loss of small signals due to non-linear crystal characteristics at low input levels, a small constant energy source B is added in series with the R-C network to provide a forward bias current for each crystal $CR_1$ and $CR_2$ of a value such, for example, as 5 microamperes. A manually-operable switch SW allows the R-C network to be shorted out when litle or nor clutter or jamming energy is present in the received radar signal.

The action of the R-C network of FIG. 2 in non-linearly reducing the amplitude of the extended clutter or jamming signals while allowing target returns or other desired indications to be passed to the third I-F amplifier stage 18 is best illustrated by reference to the graphs of FIGS. 3 and 4 of the drawings. Referring first to FIG. 3, it will be noted that in the absence of any bias developed by the R-C network of FIG. 2, the combined characteristic curves of the crystals $CR_1$ and $CR_2$ have a common zero operating point indicated by the reference character P. Under such conditions as input signal from the second I-F amplifier 16 which contains a large amount of extended clutter 28 of high amplitude is passed by the circuit to the third I-F amplifier stage 18 with no substantial attenuation of the clutter energy.

However, the development of a bias voltage on capacitor C of FIG. 2 acts in effect to shift the operating point of each crystal diode, as shown in FIG. 4. In other words, crystal $CR_1$ now operates from a new point $P_1$ while crystal $CR_2$ operates from a new point $P_2$. The effect of this shift in operating points for the respective crystals is to cause the clutter or jamming energy in the incoming signal from the second I-F amplifier stage to be severely attenuated, while a target indication (represented by the pulse 30 in FIGS. 3 and 4) falls upon an essentially linear portion of each diode's characteristic curve and hence is passed to the third I-F amplifier stage 18 with negligible attenuation. The resulting improvement in the ratio between the target indication and jamming energy is graphically illustrated in FIG. 4 of the drawings, such target indication now being much more readily discernible by an observer on the screen of the radar receiver.

Values for the various components of the circuit of FIG. 2 will of course be chosen in accordance with the characteristics of the particular radar receiver into which applicant's invention is to be incorporated. However, purely as an example, the diodes $CR_1$ and $CR_2$ may be crystals of a type having a sharply rising characteristic such as that designated as the 1N270, while the capacitor C may have a value of 110 micro-microfarads.

It is emphasized, however, that the time constant of the R-C network should be such as to permit the circuit to follow the envelope of the extended clutter or jamming energy but not to follow sharp or narrow pulses such as represented by the target indication 30 in FIGS. 3 and 4.

Employment of the invention circuit such as shown in FIG. 2 of the drawings has the advantage of controlling undesired signal levels in he front end of the radar receiver and prevents these undesired signal levels from becoming large enough to cause saturation of subsequent receiver components, thereby blocking the system and rendering it effectively inoperative insofar as target detection is concerned. Furthermore, this advantage is obtained with few additional components which do not result in any appreciable decline in the receiver's reliability factor nor in any appreciable increase in the overall size and weight of the radar apparatus.

Incorporation of the network of the present concept into an AN/APQ-92 search radar, for example, results in substantial improvement in the receiver's capability of detecting moving targets against a large clutter background. In one operation, a moving target, previously discernible on the radar screen at a distance not exceeding 2 miles, was observed consistently at distances varying between 8 and 10 miles after the herein disclosed circuit was added. Measurements taken during system operation disclose that the pulse-to-clutter ratio of the radar's I-F circuitry is enhanced by approximately 20 db when the invention concept is included therein.

Obviously many modifications and variations of the present invention are possible in light of the above teachings. It is therefore to be understood that within the scope of the appended claims the invention may be practiced otherwise than as specifically described.

What is claimed is:

1. A circuit for improving the target detection capability of a radar receiver in the presence of extended clutter or c-w jamming energy which would normally cause desired target indications to be submerged in a white background on the radar screen and hence render them difficult of detection by an observer, said circuit being designed for insertion between two successive amplifier stages in the I-F section of the radar receiver, said circuit comprising:

an input transformer coupling signal energy to said circuit from the initial one of said two successive I-F amplifier stages;

an output transformer coupling signal energy from said circuit to the following one of said two successive I-F amplifier stages;

a pair of unidirection current-conducting devices respectively coupling corresponding ends of the secondary winding of said input transformer and the primary winding of said output transformer, said unidirectional current-conducting devices each having a characteristic curve which is non-linear over a portion of its length; and means for equally biasing each current-conducting device of said pair so as to shift its operating point and hence maintain such device non-conductive until the signal energy applied thereto has reached a level determined by the magnitude of the bias.

2. A circuit according to claim 1 in which said current-conducting devices are crystal diodes.

3. A circuit according to claim 2 in which said beams for equally biasing each unidirectional current-conducting device of said pair so as to shift the operating point thereof comprises an R-C network connected between a center tap on the secondary winding of said input transformer and a center tap on the winding of said output transformer.

4. A circuit according to claim 3 in which the time constant of said R-C network is chosen so that the voltage developed on the capacitor of said network is representative of the envelope of the extended clutter or c-w jamming energy contained in the signal received by said radar.

5. A circuit according to claim 4, further including a source of constant bias voltage connected in series with said R-C network between the respective center taps on said transformer windings.

6. In a radar receiver operating in an environment where extended clutter or c-w jamming energy is present, which spurious variations cause desired target indications to be submerged in a white background on the radar screen and hence rendered difficult of detection by an observer, the improvement which comprises:

means for enhancing the target detection capability of said radar receiver, said means comprising a non-linear network coupling two successive I-F amplifier stages of said receiver, said non-linear network having a discriminatory effect on different amplitude levels of the radar signal passing through said network, such that spurious variations extending to a given amplitude level are in effect attenuated to a greater degree than desired target indications extending beyond such given amplitude level.

* * * * *